United States Patent
Park et al.

(10) Patent No.: US 8,785,056 B2
(45) Date of Patent: Jul. 22, 2014

(54) ELECTROLYTE FOR RECHARGEABLE LITHIUM BATTERY AND RECHARGEABLE LITHIUM BATTERY INCLUDING THE SAME

(75) Inventors: Dai-In Park, Yongin-si (KR); Ho-Seok Yang, Yongin-si (KR); In-Haeng Cho, Yongin-si (KR)

(73) Assignee: Samsung SDI Co., Ltd., Yongin-si, Gyeonggi-Do (KR)

( * ) Notice: Subject to any disclaimer, the term of this patent is extended or adjusted under 35 U.S.C. 154(b) by 309 days.

(21) Appl. No.: 13/237,664

(22) Filed: Sep. 20, 2011

(65) Prior Publication Data

US 2012/0196192 A1 Aug. 2, 2012

(30) Foreign Application Priority Data

Jan. 27, 2011 (KR) .................. 10-2011-0008299

(51) Int. Cl.
*H01M 6/16* (2006.01)

(52) U.S. Cl.
USPC ........... 429/336; 429/339; 429/324; 429/321; 429/322; 429/328

(58) Field of Classification Search
CPC ... H01M 6/16; H01M 10/0525; H01M 6/164; H01M 2300/0017; H01M 2300/0025
USPC ............... 429/336, 339, 324, 321, 322, 328
See application file for complete search history.

(56) References Cited

U.S. PATENT DOCUMENTS

| | | | |
|---|---|---|---|
| 6,235,431 B1 | 5/2001 | Takechi et al. | |
| 6,630,272 B1 | 10/2003 | Iwamoto et al. | |

FOREIGN PATENT DOCUMENTS

| | | | |
|---|---|---|---|
| JP | 10-50344 A | 2/1998 | |
| JP | 11-16602 A | 1/1999 | |
| KR | 10-2001-0101088 A | 11/2001 | |
| KR | 10-2004-0061562 A | 7/2004 | |
| KR | 10-0813309 B1 | 3/2008 | |
| KR | 10-2008-0046880 A | 5/2008 | |
| KR | 1020080046880 * | 5/2008 | ............ H01M 10/40 |
| KR | 10-2008-0110160 A | 12/2008 | |
| KR | 10-2009-0029566 A | 3/2009 | |

OTHER PUBLICATIONS

Parker et al., "Silylated amino-triazines: new ligands with potential multi-coordination modes", 2002, Inorganic Chemistry Communications, 5, pp. 516-518.*

(Continued)

*Primary Examiner* — Barbara Gilliam
*Assistant Examiner* — Angela Martin
(74) *Attorney, Agent, or Firm* — Knobbe Martens Olson & Bear LLP

(57) ABSTRACT

In one aspect, a rechargeable lithium battery including an electrolyte for the rechargeable lithium battery is provided. The electrolyte for the rechargeable lithium battery includes: a non-aqueous organic solvent; a lithium salt; and a compound represented by Chemical Formula 1.

[Chemical Formula 1]

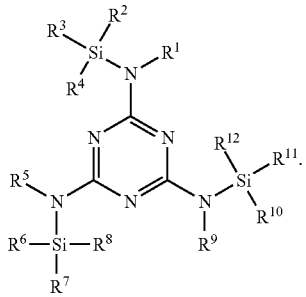

16 Claims, 2 Drawing Sheets

(56) References Cited

OTHER PUBLICATIONS

Parker et al., "Silylated Amino-Triazines: New Ligands with Potential Multi-Coordination Modes," *Inorg. Chem. Commun.,* 2002, 5: 516-518.
Zhang, Sheng Shui, "A Review on Electrolyte Additives for Lithium-ion Batteries," *J. Power Sources,* 2006, 162: 1379-1394.
Korean Notice of Allowance dated Jun. 26, 2013 for Korean Patent Application No. KR 10-2011-0008299 which corresponds to captioned U.S. Appl. No. 13/237,664.
Korean Office Action dated Jan. 30, 2013 for Korean Patent Application No. KR 10-2011-0008299 which corresponds to captioned U.S. Appl. No. 13/237,664.

* cited by examiner

ELECTROLYTE FOR RECHARGEABLE LITHIUM BATTERY AND RECHARGEABLE LITHIUM BATTERY INCLUDING THE SAME

CROSS-REFERENCE TO RELATED APPLICATIONS

This application claims priority to and the benefit of Korean Patent Application No. 10-2011-0008299 filed on Jan. 27, 2011 in the Korean Intellectual Property Office, the disclosure of which is incorporated herein in its entirety by reference.

BACKGROUND

1. Field

This disclosure relates to an electrolyte for a rechargeable lithium battery and a rechargeable lithium battery including the same.

2. Description of the Related Technology

Lithium rechargeable batteries using an organic electrolyte have twice the discharge voltage of conventional batteries using an alkali aqueous solution and accordingly, have high energy density.

The negative active materials of rechargeable lithium batteries have been made of various carbon-based materials such as artificial graphite, natural graphite, and hard carbon, which can all intercalate and deintercalate lithium ions.

Composite metal oxides such as $LiCoO_2$, $LiMn_2O_4$, $LiNiO_2$, $LiNi_{1-x}Co_xO_2$ (0<x<1), $LiMnO_2$, $Li[NiCoMn]O_2$, and the like, have been studied as positive active materials for rechargeable lithium batteries.

One or more lithium salt dissolved in a non-aqueous solvent of ethylene carbonate, dimethyl carbonate, diethyl carbonate, and the like have been used as an electrolyte for rechargeable lithium batteries.

During the initial charge of a rechargeable lithium battery, lithium ions released from the lithium-transition metal oxide, i.e., the positive electrode of the battery, are transferred to a carbon negative electrode where the ions are intercalated into the carbon. Lithium reacts with the carbon negative electrode to produce $Li_2CO_3$, LiO, LiOH, etc., thereby forming a thin film on the surface of the negative electrode. This film is referred to as a solid electrolyte interface (SEI) film. The SEI film formed during the initial charge not only prevents the reaction between lithium ions and the carbon negative electrode or other materials during charging and discharging, but it also acts as an ion tunnel, allowing the passage of only lithium ions. The ion tunnel prevents disintegration of the structure of the carbon negative electrode, which is caused by co-intercalation of organic solvents having a high molecular weight along with solvated lithium ions into the carbon negative electrode. The SEI film prevents lithium ions from reacting with the carbon electrode and side reaction with other materials does not occur, such that the amount of lithium ions is reversibly maintained.

However, gases are generated inside a battery that uses a carbonate-based organic solvent due to decomposition of a carbonate-based organic solvent during the organic SEI film-forming reaction. These gases include $H_2$, CO, $CO_2$, $CH_4$, $C_2H_6$, $C_3H_8$, $C_3H_6$, etc. depending on the type of non-aqueous organic solvent and negative active material used. Generation of gases inside the battery causes the battery to swell in a thickness direction when it is charged. When the battery is fully charged and kept at a high temperature (for example, 100% charged at 4.2V and allowed to stand at 85° C. for four days), the organic SEI film gradually decomposes based on the electrochemical energy and heat energy that increases as time passes, continuously causing a reaction with a new adjacent surface of the negative electrode with exposed electrolyte. The continuous generation of gases increases the internal pressure inside of the battery.

There is a need for development of an electrolyte additive to suppress the volume expansion of rechargeable lithium battery. Inhibiting or decreasing gas generation during a SEI film-forming reaction is one such approach.

SUMMARY

One aspect of this disclosure provides an electrolyte for a rechargeable lithium battery having high temperature stability and excellent cycle-life characteristics.

Another aspect of this disclosure provides a rechargeable lithium battery including an electrolyte for the rechargeable lithium battery.

Some embodiments provide an electrolyte for a rechargeable lithium battery is provided that includes a non-aqueous organic solvent; a lithium salt; and a compound represented by the following Chemical Formula 1:

[Chemical Formula 1]

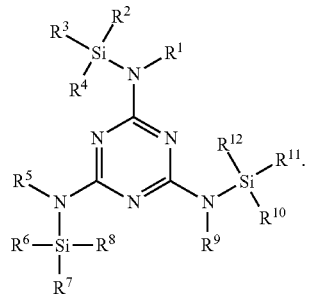

In Chemical Formula 1, $R^1$ to $R^{12}$ are the same or different, and are each independently hydrogen, a substituted or unsubstituted C1 to C30 aliphatic organic group, a substituted or unsubstituted C3 to C30 alicyclic organic group, or a substituted or unsubstituted C6 to C30 aromatic organic group. In some embodiments, $R^1$, $R^5$, and $R^9$ can be hydrogen. In some embodiments, $R^2$-$R^4$, $R^6$-$R^8$, and, $R^{10}$-$R^{12}$ can be a C1 to C10 alkyl group. In some embodiments, $R^2$-$R^4$, $R^6$-$R^8$, and, $R^{10}$-$R^{12}$ can be a C2 to C10 alkyl group.

In some embodiments, the compound represented by the above Chemical Formula 1 may include compounds represented by the following Chemical Formulae 2 to 5.

[Chemical Formula 2]

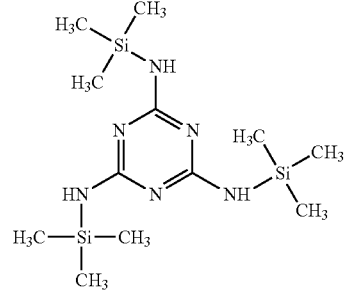

-continued

[Chemical Formula 3]

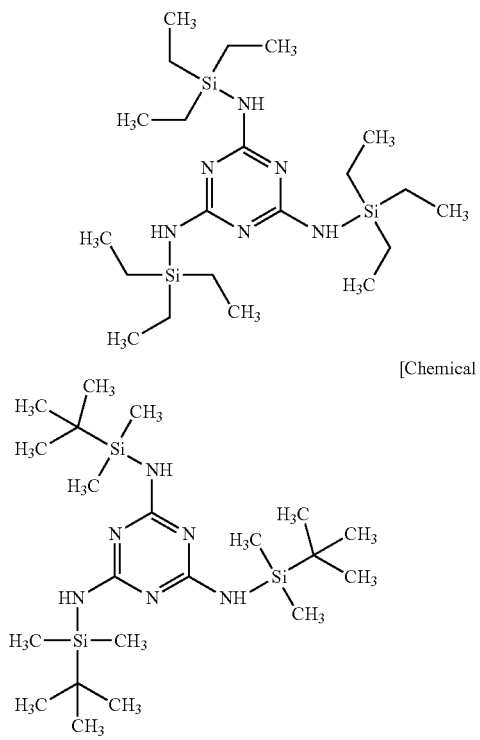

[Chemical Formula 4]

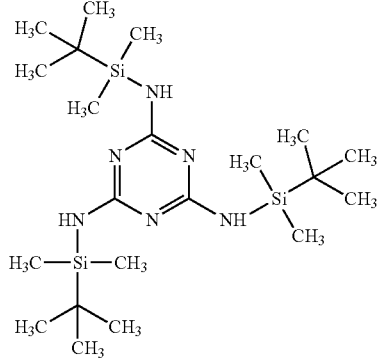

[Chemical Formula 5]

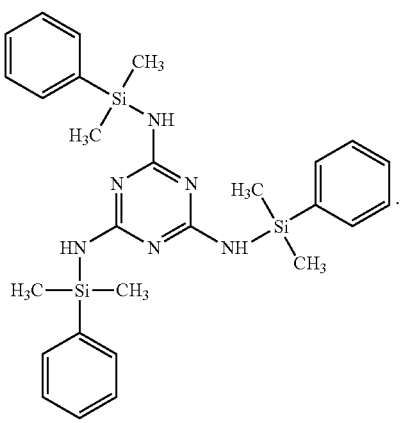

In some embodiments, the electrolyte for a rechargeable lithium battery may include the additive in an amount of 0.5 wt % to 10 wt % based on the total weight of the electrolyte for a rechargeable lithium battery.

In some embodiments, the lithium salt may include a fluorinated lithium salt and the fluorinated lithium salt may include $LiPF_6$, $LiBF_4$, $LiSbF_6$, $LiAsF_6$, $LiCF_3SO_3$, $LiN(SO_2C_2F_5)_2$, $Li(CF_3SO_2)_2N$, $LiN(SO_3C_2F_5)_2$, $LiC_4F_9SO_3$, $LiN(C_xF_{2x+1}SO_2)(C_yF_{2y+1}SO_2)$ (wherein x and y are natural numbers), or a combination thereof. In some embodiments, the fluorinated lithium salt can be $LiPF_6$.

In some embodiments, the electrolyte for a rechargeable lithium battery may have an exotherm starting temperature of about 90° C. or more, and exothermic heat of about 250 J/g or less.

According to another aspect of this disclosure, a rechargeable lithium battery is provided that includes a positive electrode including a positive active material; a negative electrode including a negative active material; and the electrolyte.

Hereinafter, further embodiments of this disclosure will be described in detail.

The electrolyte for a rechargeable lithium battery may have excellent high temperature stability and cycle-life characteristics.

Some embodiments provide a rechargeable lithium battery, comprising a positive electrode having a positive active material, a negative electrode having a negative active material, and an electrolyte comprising a non-aqueous organic solvent; a lithium salt; and a compound represented by the following Chemical Formula 1:

[Chemical Formula 1]

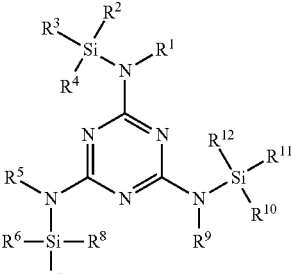

wherein $R^1$ to $R^{12}$ are the same or different, and are each independently hydrogen, a substituted or unsubstituted C1 to C30 aliphatic organic group, a substituted or unsubstituted C3 to C30 alicyclic organic group, or a substituted or unsubstituted C6 to C30 aromatic organic group. In some embodiments, $R^1$, $R^5$, and $R^9$ can be hydrogen. In some embodiments, $R^2$-$R^4$, $R^6$-$R^8$, and $R^{10}$-$R^{12}$ can be a C1 to C10 alkyl group. In some embodiments, $R^2$-$R^4$, $R^6$-$R^8$, and $R^{10}$-$R^{12}$ can be a C2 to C10 alkyl group. In some embodiments, the compound represented by Chemical Formula 1 has the structure of Chemical Formulae 2 to 5:

[Chemical Formula 2]

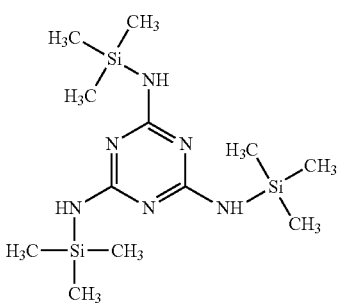

[Chemical Formula 3]

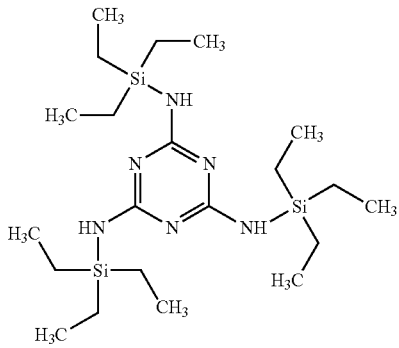

-continued

[Chemical Formula 4]

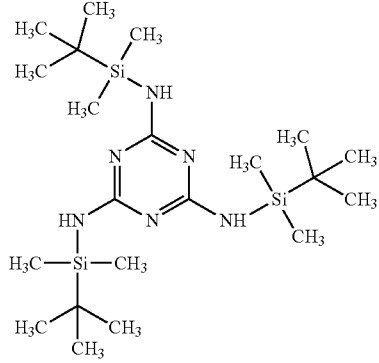

[Chemical Formula 5]

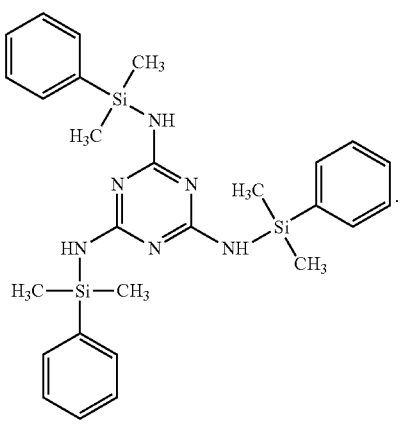

In some embodiments, the additive for the electrolyte for a rechargeable lithium battery is included in an amount of about 0.5 wt % to about 10 wt % based on the total weight of the electrolyte. In some embodiments, the lithium salt comprises a fluorinated lithium salt. In some embodiments, the fluorinated lithium salt is selected from the group consisting of $LiPF_6$, $LiBF_4$, $LiSbF_6$, $LiAsF_6$, $LiCF_3SO_3$, $LiN(SO_2C_2F_5)_2$, $Li(CF_3SO_2)_2N$, $LiN(SO_3C_2F_5)_2$, $LiC_4F_9SO_3$, $LiN(C_xF_{2x+1}SO_2)(C_yF_{2y+1}SO_2)$ and combinations thereof, where x and y are natural numbers. In some embodiments, the fluorinated lithium salt is $LiPF_6$.

Some embodiments provide a compound represented by the following Chemical Formula 1:

[Chemical Formula 1]

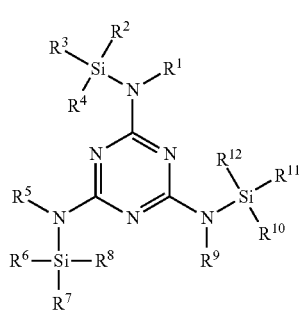

wherein $R^1$ to $R^{12}$ are the same or different, and are each independently hydrogen, a substituted or unsubstituted C2 to C30 aliphatic organic group, a substituted or unsubstituted C3 to C30 alicyclic organic group, or a substituted or unsubstituted C6 to C30 aromatic organic group. In some embodiments, $R^1$, $R^5$, and $R^9$ can be hydrogen. In some embodiments, $R^2$-$R^4$, $R^6$-$R^8$, and, $R^{10}$-$R^{12}$ can be a C1 to C10 alkyl group. In some embodiments, $R^2$-$R^4$, $R^6$-$R^8$, and, $R^{10}$-$R^{12}$ can be a C2 to C10 alkyl group. In some embodiments, the compound represented by Chemical Formula 1 has the structure of Chemical Formulae 3 to 5:

[Chemical Formula 3]

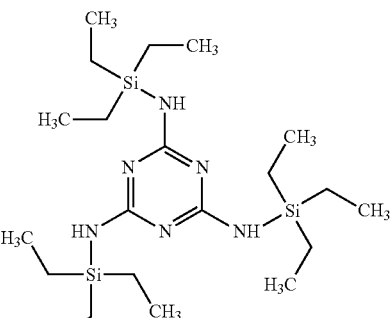

[Chemical Formula 4]

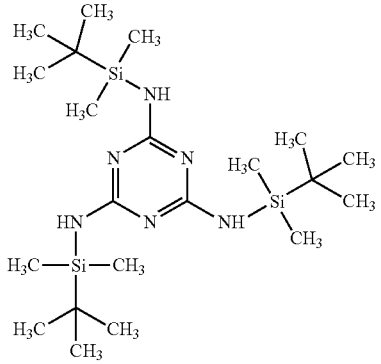

[Chemical Formula 5]

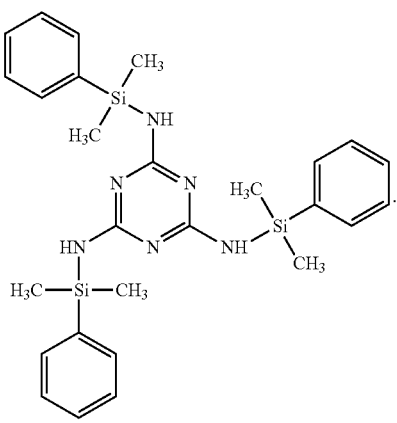

DETAILED DESCRIPTION

Figure 1:
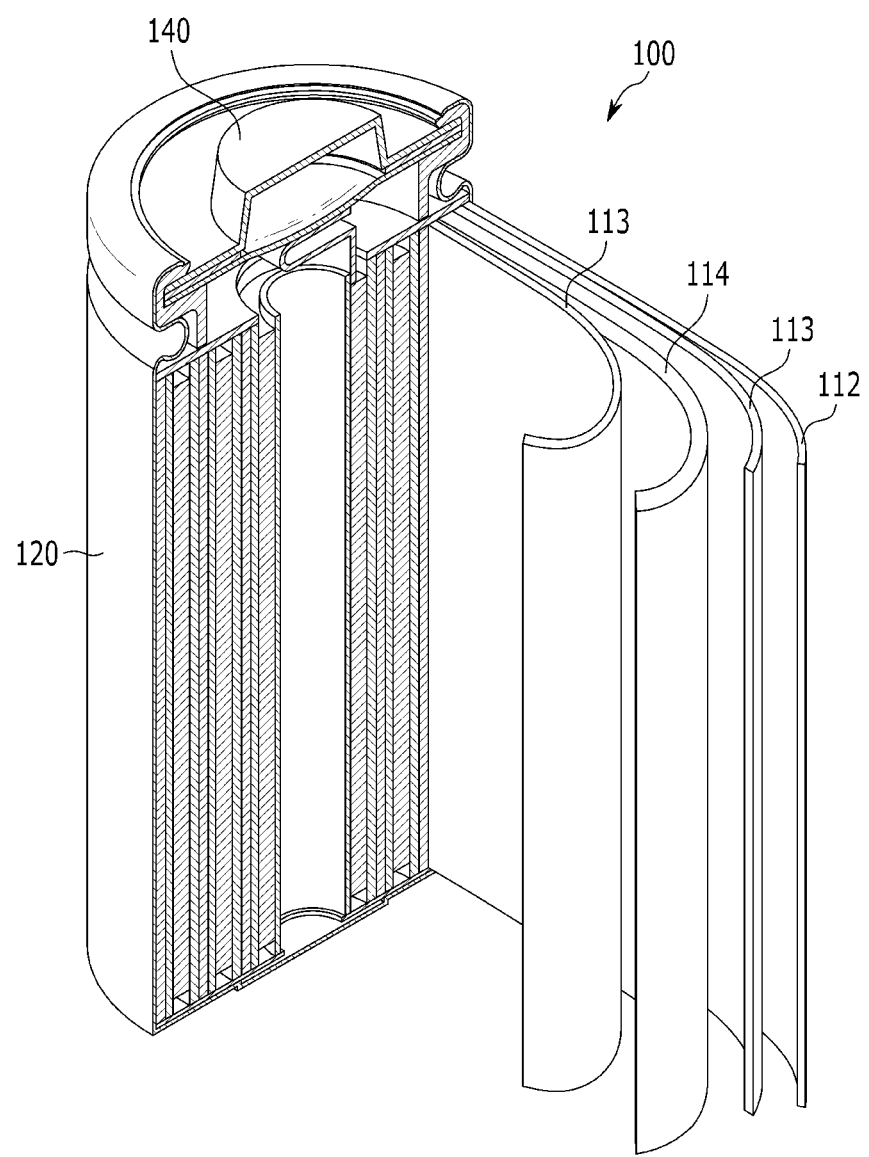
FIG. 1 is a schematic view of a rechargeable lithium battery according to one embodiment.

An exemplary embodiment of this disclosure will hereinafter be described in detail. However, the embodiment is only exemplary, and this disclosure is not limited thereto.

As used herein, when a specific definition is not otherwise provided, the term "substituted" refers to a parent structure in which there has been an exchange of one or more hydrogen atoms for another atom or group. When substituted, the substituent group(s) is (are) one or more group(s) individually and independently selected from the group consisting of a halogen (F, Br, Cl or I), a hydroxyl group, a nitro group, a cyano group, an amino group ($NH_2$, $NH(R^{100})$, or $N(R^{101})(R^{102})$, wherein $R^{100}$, $R^{101}$ and $R^{102}$ are the same or different, and are each independently a C1 to C10 alkyl group, an amidino group, a hydrazine group, a hydrazone group, a carboxyl group, an alkyl group, a haloalkyl group, an alkoxy group, an alicyclic organic group, an aryl group, an alkenyl group, an alkynyl group, a heteroaryl group, and a heterocycloalkyl group, where said alkyl group, haloalkyl group, alkoxy group, alicyclic organic group, aryl group, alkenyl group, alkynyl group, heteroaryl group, and heterocycloalkyl group in the definition of $R^{100}$, $R^{101}$ and $R^{102}$ are each independently unsubstituted or substituted with one or more substituents selected from the group consisting of a halogen (F, Br, Cl or I), a hydroxyl group, a nitro group, and a cyano group.

As used herein, when other specific definition is not otherwise provided, the term "alkyl group" may refer to a C1 to C30 alkyl group, and specifically C1 to C20 alkyl group, the term "cycloalkyl group" may refer to a C3 to C30 cycloalkyl group, and specifically C3 to C20 cycloalkyl group, the term "heterocycloalkyl group" may refer to a C2 to C30 heterocycloalkyl group, and specifically C2 to C20 heterocycloalkyl group, the term "alkylene group" may refer to a C1 to C30 alkylene group, and specifically C1 to C20 alkylene group, the term "alkoxy group" may refer to a C1 to C30 alkoxy group, and specifically C1 to C20 alkoxy group, the term "cycloalkylene group" may refer to a C3 to C30 cycloalkylene group, and specifically C3 to C20 cycloalkylene group, the term "heterocycloalkylene group" may refer to a C2 to C30 heterocycloalkylene group, and specifically C2 to C20 heterocycloalkylene group, the term "aryl group" may refer to a C6 to C30 aryl group, and specifically C6 to C20 aryl group, the term "heteroaryl group" may refer to a C2 to C30 heteroaryl group, and specifically C2 to C18 heteroaryl group, the term "arylene group" may refer to a C6 to C30 arylene group, and specifically C6 to C20 arylene group, the term "heteroarylene group" may refer to a C2 to C30 heteroarylene group, and specifically C2 to C20 heteroarylene group, the term "alkylaryl group" may refer to a C7 to C30 alkyl aryl group, and specifically C7 to C20 alkylaryl group, and the term "halogen" may refer to F, Cl, Br, or I.

As used herein, when other specific definition is not otherwise provided, the terms "heterocycloalkyl group, heterocycloalkylene group, heteroaryl group, and heteroarylene group" may refer to a cycloalkyl group, a cycloalkylene group, an aryl group, and an arylene group including 1 to 3 heteroatoms selected of N, O, S, Si, or P and remaining carbons in one ring.

As used herein, when other specific definition is not otherwise provided, the term "aliphatic" may refer to a C1 to C30 alkyl, a C2 to C30 alkenyl, a C2 to C30 alkynyl, a C1 to C30 alkylene, a C2 to C30 alkenylene, or a C2 to C30 alkynylene, and specifically a C1 to C20 alkyl, a C2 to C20 alkenyl, a C2 to C20 alkynyl, a C1 to C20 alkylene, a C2 to C20 alkenylene, or a C2 to C20 alkynylene, the term "alicyclic" may refer to a C3 to C30 cycloalkyl, a C3 to C30 cycloalkenyl, a C3 to C30 cycloalkynyl, a C3 to C30 cycloalkylene, a C3 to C30 cycloalkenylene, or a C3 to C30 cycloalkynylene, and specifically a C3 to C20 cycloalkyl, a C3 to C20 cycloalkenyl, a C3 to C20 cycloalkynyl, C3 to C20 cycloalkylene, a C3 to C20 cycloalkenylene, or a C3 to C20 cycloalkynylene, and the term "aromatic" may refer to a C6 to C30 aryl, a C2 to C30 heteroaryl, a C6 to C30 arylene, or a C2 to C30 heteroarylene, and specifically a C6 to C16 aryl, a C2 to C16 heteroaryl, a C6 to C16 arylene, or a C2 to C16 heteroarylene.

Also, in this specification, "*" denotes the same or different atom or a part connected with Chemical Formula.

The electrolyte for a rechargeable lithium battery according to one embodiment includes a non-aqueous organic solvent; a lithium salt; and an additive including a compound represented by the following Chemical Formula 1.

[Chemical Formula 1]

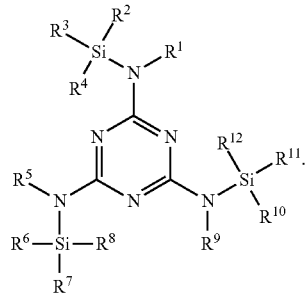

In Chemical Formula 1, $R^1$ to $R^{12}$ are the same or different, and are each independently hydrogen, a substituted or unsubstituted C1 to C30 aliphatic organic group, a substituted or unsubstituted C3 to C30 alicyclic organic group, or a substituted or unsubstituted C6 to C30 aromatic organic group. Specifically, $R^1$ to $R^{12}$ may be a C1 to C30 alkyl group, and more specifically a C1 to C10 alkyl group. In some embodiments, $R^1$, $R^5$, and $R^9$ can be hydrogen. In some embodiments, $R^2$-$R^4$, $R^6$-$R^8$, and, $R^{10}$-$R^{12}$ can be a C1 to C10 alkyl group. In some embodiments, $R^2$-$R^4$, $R^6$-$R^8$, and, $R^{10}$-$R^{12}$ can be a C2 to C10 alkyl group.

In some embodiments, the compound represented by the above Chemical Formula 1 and the electrolyte additive for a rechargeable lithium battery which includes the compound may be easily dissolved in a non-aqueous organic solvent.

In some embodiments, the compound represented by the above Chemical Formula 1 includes a flame-retardant melamine structure, the electrolyte additive for a rechargeable lithium battery which includes the compound has excellent heat resistance and thus the electrolyte for a rechargeable lithium battery may have improved high temperature stability.

In some embodiments, the compound represented by the above Chemical Formula 1 includes an N—Si bond that may react with HF and $H_2O$, which can be generated in the course of charging and discharging of a rechargeable lithium battery. In some embodiments, the HF and $H_2O$ may be easily removed by the compound of Chemical Formula 1. Therefore, the electrolyte for a rechargeable lithium battery which includes the compound represented by the above Chemical Formula 1 may have excellent cycle-life characteristic.

For example, a compound including a N—Si bond may remove HF by reacting with HF based on the following Reaction Scheme 1, and it may remove $H_2O$ by reacting with $H_2O$ based on the following Reaction Scheme 2.

[Reaction Scheme 1]

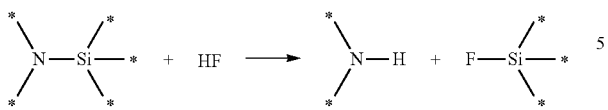

[Reaction Scheme 2]

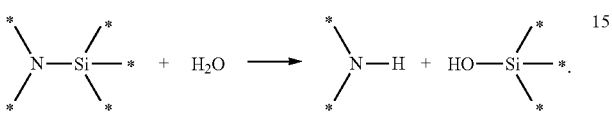

In some embodiments, the compound represented by the above Chemical Formula 1 may effectively prevent the structure of a negative electrode from being degraded by being decomposed earlier than a non-aqueous organic solvent, for example, carbonate-based organic solvent, during the initial charge and forming a stable SEI film on the surface of the negative electrode. In some embodiments, the compound represented by the above Chemical Formula 1 may suppress carbonate-based organic solvent, such as ethylene carbonate and dimethyl carbonate, from being decomposed at a room temperature and high temperature. In some embodiments, the compound represented by the above Chemical Formula 1 may suppress the generation of a gas generated from the decomposition of the carbonate-based organic solvent, and thereby suppress an increase in the volume expansion and internal pressure of a rechargeable lithium battery. Therefore, it may be possible to improve the cycle-life characteristic of a rechargeable lithium battery including it.

In some embodiments, the compound represented by the above Chemical Formula 1 may form a coordination bond with a transition element eluted from a positive active material for a rechargeable lithium battery, and thereby a stable film may be formed on the surface of the positive electrode. In this way, the cycle-life characteristic of a rechargeable lithium battery may be improved.

In some embodiments, the compound represented by the above Chemical Formula 1 may include the compounds represented by the following Chemical Formulae 2 to 5, but is not limited thereto:

[Chemical Formula 2]

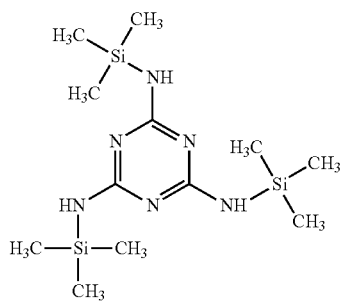

[Chemical Formula 3]

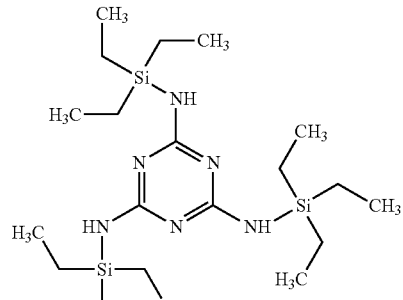

[Chemical Formula 4]

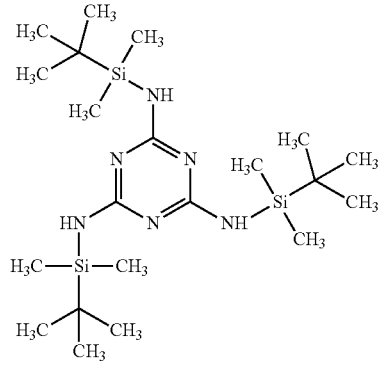

[Chemical Formula 5]

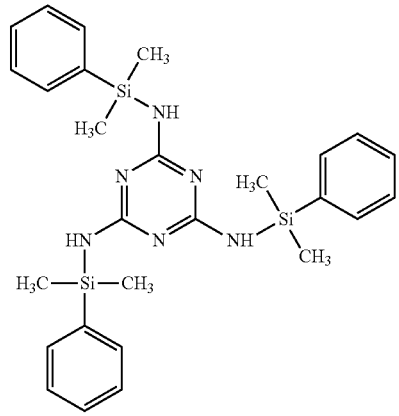

[Chemical Formula 3]

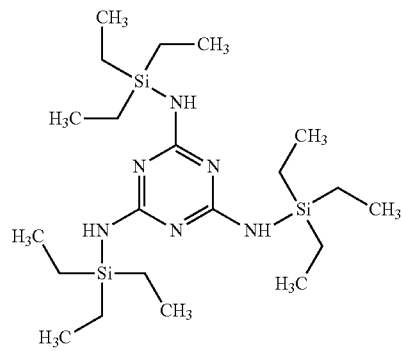

-continued

[Chemical Formula 4]

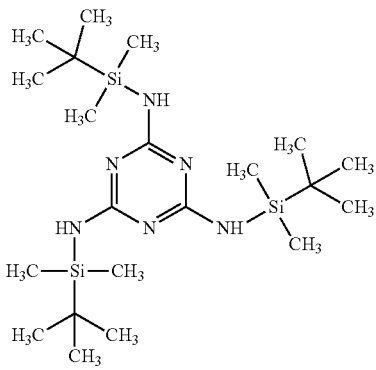

[Chemical Formula 5]

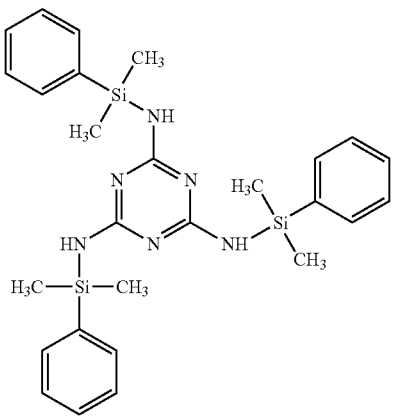

In some embodiments, the additive for an electrolyte for a rechargeable lithium battery may be included in an amount of about 0.5 wt % to about 10 wt % based on the total weight of the electrolyte for a rechargeable lithium battery. When the additive for the electrolyte for a rechargeable lithium battery is included within the range, the rechargeable lithium battery including the additive may be effectively suppressed from being volumetrically expanded and from an increase in the internal pressure at a room temperature and high temperature. Thus, the stability of the rechargeable lithium battery may be improved. In some embodiments, the high-temperature stability of the electrolyte for a rechargeable lithium battery including the additive may be effectively improved. In a typical embodiment, the additive for the electrolyte for a rechargeable lithium battery may be included in an amount of about 0.1 wt % to about 3 wt % based on the total weight of the electrolyte for a rechargeable lithium battery.

In some embodiments, the electrolyte may further include vinylene carbonate or an ethylene carbonate-based compound of the following Chemical Formula 6 in order to improve battery cycle-life.

[Chemical Formula 6]

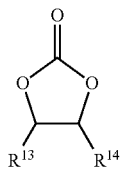

In Chemical Formula 6, $R^{13}$ and $R^{14}$ are the same or different, and are each independently hydrogen, a halogen, a cyano (CN), a nitro ($NO_2$), and a C1 to C5 fluoroalkyl, provided that both $R^{13}$ and $R^{14}$ are not hydrogen.

Examples of the ethylene carbonate-based compound includes difluoroethylene carbonate, chloroethylene carbonate, dichloroethylene carbonate, bromoethylene carbonate, dibromoethylene carbonate, nitroethylene carbonate, cyanoethylene carbonate, fluoroethylene carbonate, and combinations thereof. In one embodiment, fluoroethylene carbonate may be preferable.

In some embodiments, the vinylene carbonate-based compound and the ethylene carbonate-based compound may form a stabled SEI film in a negative electrode. Thus, although there are many transferring of lithium ions, the SEI film is not broken and sustained well during a charge and discharge to thereby effectively maintain charge capacity and discharge capacity. Therefore, the cycle-life characteristics of the rechargeable lithium battery including the SEI film may be effectively improved.

In some embodiments, the use amount of the additive for improving cycle life may be adjusted within an appropriate range.

In the electrolyte of a rechargeable lithium battery, the non-aqueous organic solvent acts as a medium for transmitting ions taking part in the electrochemical reaction of the battery. In some embodiments, the non-aqueous organic solvent may include a carbonate-based, ester-based, ether-based, ketone-based, alcohol-based, or aprotic solvent, but is not limited thereto.

In some embodiments, the carbonate-based solvent may include dimethyl carbonate (DMC), diethyl carbonate (DEC), dipropyl carbonate (DPC), methyl propyl carbonate (MPC), ethyl propyl carbonate (EPC), ethyl methyl carbonate (EMC), ethylene carbonate (EC), propylene carbonate (PC), butylene carbonate (BC), and the like.

In some embodiments, the ester-based solvent may include methyl acetate, ethyl acetate, n-propyl acetate, dimethyl acetate, methylpropinonate, ethylpropinonate, γ-butyrolactone, decanolide, valerolactone, mevalonolactone, caprolactone, and the like.

In some embodiments, the ether-based solvent may include dimethyl ether, dibutyl ether, tetraglyme, diglyme, dimethoxyethane, 2-methyltetrahydrofuran, tetrahydrofuran (THF), and the like.

In some embodiments, the ketone-based solvent may include cyclohexanone, and the like.

In some embodiments, the alcohol-based solvent may include ethanol, isopropyl alcohol, and the like.

In some embodiments, the aprotic solvent include nitriles such as R—CN (wherein R is a C2 to C20 linear, branched, or cyclic hydrocarbon, and may include one or more double bonds, one or more aromatic rings, or one or more ether bonds), amides such as dimethylformamide, dimethylacetamide, dioxolanes such as 1,3-dioxolane, sulfolanes, cycloalkanes such as cyclohexane, and the like.

In some embodiments, the non-aqueous organic solvent may be used singularly or in a mixture. When the organic solvent is used in a mixture, a mixture ratio may be controlled in accordance with a desirable battery performance.

In some embodiments, the carbonate-based solvent may include a mixture of a cyclic carbonate and a linear carbonate. The cyclic carbonate and the chain carbonate are mixed together in the volume ratio of about 1:1 to about 1:9, and when the mixture is used as an electrolyte, the electrolyte performance may be enhanced.

In addition, the electrolyte of this disclosure may further include aromatic hydrocarbon-based solvents, in addition to the carbonate-based solvents. The carbonate-based solvents and the aromatic hydrocarbon-based solvents are mixed together in the volume ratio of about 1:1 to about 30:1.

In some embodiments, the aromatic hydrocarbon-based organic solvent may be represented by the following Chemical Formula 7.

[Chemical Formula 7]

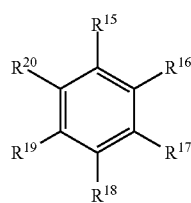

In Chemical Formula 7, $R^{15}$ to $R^{20}$ are the same or different, and each independently hydrogen, a halogen, a C1 to C10 alkyl, a C1 to C10 haloalkyl, or combinations thereof.

In some embodiments, the aromatic hydrocarbon-based organic solvent may include, but is not limited to, at least one selected from benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 1,2-difluorotoluene, 1,3-difluorotoluene, 1,4-difluorotoluene, 1,2,3-trifluorotoluene, 1,2,4-trifluorotoluene, chlorotoluene, 1,2-dichlorotoluene, 1,3-dichlorotoluene, 1,4-dichlorotoluene, 1,2,3-trichlorotoluene, 1,2,4-trichlorotoluene, iodotoluene, 1,2-diiodotoluene, 1,3-diiodotoluene, 1,4-diiodotoluene, 1,2,3-triiodotoluene, 1,2,4-triiodotoluene, xylene, and a combination thereof.

The lithium salt supplies lithium ions in the battery, and operates a basic operation of a rechargeable lithium battery and improves lithium ion transport between positive and negative electrodes. In some embodiments, the lithium salt include at least one supporting salt selected from $LiPF_6$, $LiBF_4$, $LiSbF_6$, $LiAsF_6$, $LiCF_3SO_3$, $LiN(SO_2C_2F_5)_2$, $Li(CF_3SO_2)_2N$, $LiN(SO_3C_2F_5)_2$, $LiC_4F_9SO_3$, $LiClO_4$, $LiAlO_4$, $LiAlO_2$, $LiAlCl_4$, $LiN(C_xF_{2x+1}SO_2)(C_yF_{2y+1}SO_2)$ (wherein, x and y are natural numbers), LiCl, LiI, $LiB(C_2O_4)_2$ (lithium bis(oxalato)borate, LiBOB), and a combination thereof.

In some embodiments, the lithium salt may be a fluorinated lithium salt, and the fluorinated lithium salt may include $LiPF_6$, $LiBF_4$, $LiSbF_6$, $LiAsF_6$, $LiCF_3SO_3$, $LiN(SO_2C_2F_5)_2$, $Li(CF_3SO_2)_2N$, $LiN(SO_3C_2F_5)_2$, $LiC_4F_9SO_3$, $LiN(C_xF_{2x+1}SO_2)(C_yF_{2y+1}SO_2)$ (wherein, x and y are natural numbers), or a combination thereof, but is not limited thereto. When a fluorinated lithium salt is used as a lithium salt, the effect of the additive for the electrolyte for a rechargeable lithium battery fabricated in accordance with an embodiment of this disclosure may be maximized.

In some embodiments, the lithium salt may be used in a concentration of about 0.1 to about 2.0M, and in one embodiment, in a concentration of about 0.5 to about 2.0M. When the lithium salt is included at the above concentration range, electrolyte performance and lithium ion mobility may be enhanced due to optimal electrolyte conductivity and viscosity.

In some embodiments, the electrolyte for a rechargeable lithium battery may have an exotherm starting temperature of about 90° C. or more, and exothermic heat of 250 J/g or less. In this case, the flame retardant of the electrolyte for a rechargeable lithium battery may be improved, and accordingly, the safety of the rechargeable lithium battery including the electrolyte for a rechargeable lithium battery may be effectively improved.

According to another embodiment of this disclosure, a rechargeable lithium battery is provided that includes a positive electrode including a positive active material, a negative electrode including a negative active material, and the above described electrolyte.

In some embodiments, the positive electrode includes a current collector and a positive active material layer including a positive active material positioned on the current collector.

In some embodiments, the positive active material includes lithiated intercalation compounds that reversibly intercalate and deintercalate lithium ions. In some embodiments, the positive active material may include a composite oxide including at least one selected from the group consisting of cobalt, manganese, and nickel, as well as lithium. In one embodiment, the following lithium-containing compounds may be used, but is not limited thereto:

$Li_aA_{1-b}R_bL_2$ (0.90≤a≤1.8 and 0≤b≤0.5); $Li_aE_{1-b}R_bO_{2-c}L_c$ (0.90≤a≤1.8, 0≤b≤0.5 and 0≤c≤0.05); $LiE_{2-b}R_bO_{4-c}L_c$ (0≤b≤0.5, 0≤c≤0.05); $Li_aNi_{1-b-c}Co_bR_cL_\alpha$ (0.90≤a≤1.8, 0≤b≤0.5, 0≤c≤0.05 and 0<α≤2); $Li_aNi_{1-b-c}Co_bR_cO_{2-\alpha}Z_\alpha$ (0.90≤a≤1.8, 0≤b≤0.5, 0≤c≤0.05 and 0<α<2); $Li_aNi_{1-b-c}Co_bR_cO_{2-\alpha}Z_2$ (0.90≤a≤1.8, 0≤b≤0.5, 0≤c≤0.05 and 0<α<2); $Li_aNi_{1-b-c}Mn_bR_cL_\alpha$ (0.90≤a≤1.8, 0≤b≤0.5, 0≤c≤0.05 and 0≤α≤2); $Li_aNi_{1-b-c}Mn_bR_cO_{2-\alpha}Z_\alpha$ (0.90≤a≤1.8, 0≤b≤0.5, 0≤c≤0.05 and 0<α<2); $Li_aNi_{1-b-c}Mn_bR_cO_{2-\alpha}Z_2$ (0.90≤a≤1.8, 0≤b≤0.5, 0≤c≤0.05 and 0<α<2); $Li_aNi_bE_cG_dO_2$ (0.90≤a≤1.8, 0≤b≤0.9, 0≤c≤0.5 and 0.001≤d≤0.1.); $Li_aNi_bCo_cMn_dGeO_2$ (0.90≤a≤1.8, 0≤b≤0.9, 0≤c≤0.5, 0≤d≤0.5 and 0.001≤e≤0.1.); $Li_aNiG_bO_2$ (0.90≤a≤1.8 and 0.001≤b≤0.1); $Li_aCoG_bO_2$ (0.90≤a≤1.8 and 0.001≤b≤0.1); $Li_aMnG_bO_2$ (0.90≤a≤1.8 and 0.001≤b≤0.1); $Li_aMn_2G_bO_4$ (0.90≤a≤1.8 and 0.001≤b≤0.1); $QO_2$; $QS_2$; $LiQS_2$; $V_2O_5$; $LiV_2O_5$; $LiTO_2$; $LiNiVO_4$; $Li_{(3-f)}J_2(PO_4)_3$ (0≤f≤2); $Li_{(3-f)}Fe_2(PO_4)_3$ (0≤f≤2); and $LiFePO_4$.

In the above Chemical Formulae, A is Ni, Co, Mn, or a combination thereof; R is Al, Ni, Co, Mn, Cr, Fe, Mg, Sr, V, a rare earth element, or a combination thereof; L is O, F, S, P, or a combination thereof; E is Co, Mn, or a combination thereof; Z is F, S, P, or a combination thereof; G is Al, Cr, Mn, Fe, Mg, La, Ce, Sr, V, or a combination thereof; Q is Ti, Mo, Mn, or a combination thereof; T is Cr, V, Fe, Sc, Y, or a combination thereof; and J is V, Cr, Mn, Co, Ni, Cu, or a combination thereof.

In one embodiment, for the positive active material, a lithium-manganese-based oxide may be preferable. The electrolyte including the additive according to one embodiment of the present invention may more effectively suppress volume expansion and internal pressure of the rechargeable lithium battery with lithium-manganese-based oxide as the positive active material.

In some embodiments, the positive active material may include the positive active material with the coating layer, or a compound of the active material and the active material coated with the coating layer. In some embodiments, the coating layer may include at least one coating element compound selected from the group consisting of an oxide of the coating element, a hydroxide of the coating element, an oxyhydroxide of the coating element, an oxycarbonate of the coating element, and a hydroxycarbonate of the coating element. In some embodiments, the compound for the coating layer may be either amorphous or crystalline. In some embodiments, the coating element included in the coating layer may be selected from the group consisting of Mg, Al, Co, K, Na, Ca, Si, Ti, V, Sn, Ge, Ga, B, As, Zr, and combinations thereof. In some embodiments, the coating process may include any conventional processes as long as it does not cause any side effects on the properties of the positive active material (e.g., spray coating, immersing), which is well known to persons having ordinary skill in this art, so a detailed description thereof is omitted.

In some embodiments, the positive active material layer can further include a binder and a conductive material.

In some embodiments, the binder can improve binding properties of the positive active material particles to each other and to a current collector. Examples of the binder include at least one selected from the group consisting of polyvinyl alcohol, carboxylmethyl cellulose, hydroxypropyl cellulose, diacetyl cellulose, polyvinylchloride, carboxylated polyvinylchloride, polyvinylfluoride, polymer including ethylene oxide, polyvinylpyrrolidone, polyurethane, polytetrafluoroethylene, polyvinylidenefluoride, polyethylene, polypropylene, styrene-butadiene rubber, acrylated styrene-butadiene rubber, an epoxy resin, nylon, and the like, but is not limited thereto.

In some embodiments, the conductive material can improve electrical conductivity of a negative electrode. Any electrically conductive material can be used as a conductive agent unless it causes a chemical change. Examples of the conductive material include at least one selected from natural graphite, artificial graphite, carbon black, Super-P (MMM company), acetylene black, ketjen black, hard carbon obtained through sintering at a high temperature), soft carbon, carbon fiber, a metal powder or a metal fiber including copper, nickel, aluminum, silver, and the like, polyphenylene derivative, and the like.

In some embodiments, the current collector may be Al, but is not limited thereto.

In some embodiments, the negative electrode includes a current collector and a negative active material layer disposed thereon. The negative active material layer includes a negative active material.

In some embodiments, the negative active material includes a material that reversibly intercalates/deintercalates lithium ions, a lithium metal, a lithium metal alloy, a material being capable of doping and dedoping lithium, or a transition metal oxide.

In some embodiments, the material that can reversibly intercalate/deintercalate lithium ions includes a carbon material. In some embodiments, the carbon material may be any generally-used carbon-based negative active material in a lithium ion rechargeable battery. Examples of the carbon material include crystalline carbon, amorphous carbon, and mixtures thereof. In some embodiments, the crystalline carbon may be non-shaped, or sheet, flake, spherical, or fiber shaped natural graphite or artificial graphite. In some embodiments, the amorphous carbon may be a soft carbon, a hard carbon, mesophase pitch carbonized products, fired coke, and the like.

Examples of the lithium metal alloy include lithium and a metal selected from the group consisting of Na, K, Rb, Cs, Fr, Be, Mg, Ca, Sr, Si, Sb, Pb, In, Zn, Ba, Ra, Ge, Al, Sn, Ti, Ag, Cd, Ga, Bi, and a combination thereof.

Examples of the material being capable of doping lithium include Si, $SiO_x$ ($0<x<2$), a Si-Q alloy (where Q is an element selected from the group consisting of an alkali metal, an alkali-earth metal, a group 13 element, a group 14 element, a group 15 element, a group 16 element, a transition element, a rare earth element, and combinations thereof, and is not Si), Sn, $SnO_2$, a Sn—R alloy (where R is an element selected from the group consisting of an alkali metal, an alkali-earth metal, a group 13 element, a group 14 element, a group 15 element, a group 16 element, a transition element, a rare earth element, and combinations thereof and is not Sn), or mixtures thereof. At least one of these materials may be mixed with $SiO_2$. In addition, carbon may further deposited on the surface of the material being capable of doping lithium. In some embodiments, the negative active material may include the negative active material with the carbon-coating layer.

Coating the surface of the above materials with carbon may be performed by decomposing such organic materials as ethylene, tetrahydrofuran (THF), and cyclohexanone at high temperature of 800° C. or higher in vacuum in the presence of the above materials, but is not limited thereto. The elements Q and R may be selected from the group consisting of Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, and a combination thereof.

Examples of the transition metal oxide include vanadium oxide, lithium vanadium oxide, and the like.

In some embodiments, the negative active material layer can include a binder, and optionally a conductive material.

In some embodiments, the binder can improve binding properties of negative active material particles with one another and with a current collector. In some embodiments, the binder can include a non-water-soluble binder, a water-soluble binder, or a combination thereof.

In some embodiments, the non-water-soluble binder can include polyvinylchloride, carboxylated polyvinylchloride, polyvinylfluoride, polymer including ethylene oxide, polyvinylpyrrolidone, polyurethane, polytetrafluoroethylene, polyvinylidene fluoride, polyethylene, polypropylene, polyamideimide, polyimide, or a combination thereof.

In some embodiments, the water-soluble binder can include a styrene-butadiene rubber, an acrylated styrene-butadiene rubber, polyvinylalcohol, sodium polyacrylate, a copolymer including propylene and a C2 to C8 olefin, a copolymer of (meth)acrylic acid and (meth)acrylic acid alkyl ester, or a combination thereof.

When the water-soluble binder is used as a negative electrode binder, a cellulose-based compound may be further used to provide viscosity. In some embodiments, the cellulose-based compound can include one or more of carboxylmethyl cellulose, hydroxypropylmethyl cellulose, methyl cellulose, or alkali metal salts thereof. In some embodiments, the alkali metal may be Na, K, or Li. In some embodiments, the cellulose-based compound may be included in an amount of about 0.1 to about 3 parts by weight based on 100 parts by weight of the binder.

As for the conductive material, any electro-conductive material that does not cause a chemical change may be used. Examples of the conductive material include a carbon-based material such as natural graphite, artificial graphite, carbon black, Super-P (TIMCAL Graphite & Carbon; Switzerland), acetylene black, ketjen black, hard carbon, soft carbon, a carbon fiber, and the like; a metal-based material such as a metal powder or a metal fiber including copper, nickel, aluminum, and silver; a conductive polymer such as a polyphenylene derivative; and a mixture thereof.

In some embodiments, the current collector can include a copper foil, a nickel foil, a stainless steel foil, a titanium foil, a nickel foam, a copper foam, a polymer substrate coated with a conductive metal, or combinations thereof.

In some embodiments, the positive and negative electrodes may be fabricated by a method including mixing the active material, the binder, and optionally the conductive material into an active material composition, and coating the composition on a current collector. In some embodiments, the solvent can include N-methylpyrrolidone and the like, but is not limited thereto. Furthermore, if the water-soluble binder is used in the negative electrode, the solvent may be water.

In some embodiments, the rechargeable lithium battery may further include a separator between the negative electrode and the positive electrode, as needed. Examples of suitable separator materials include polyethylene, polypropylene, polyvinylidene fluoride, and multi-layers thereof such as a polyethylene/polypropylene double-layered separator, a polyethylene/polypropylene/polyethylene triple-layered separator, and a polypropylene/polyethylene/polypropylene triple-layered separator.

Rechargeable lithium batteries may be classified as lithium ion batteries, lithium ion polymer batteries, and lithium polymer batteries according to the presence of a separator and the kind of electrolyte used therein. The rechargeable lithium batteries may have a variety of shapes and sizes, and include cylindrical, prismatic, coin, or pouch-type batteries, and may be thin film batteries or may be rather bulky in size.

FIG. 1 is a schematic view of a schematic structure of a rechargeable lithium battery. FIG. 1 illustrates a cylindrical rechargeable lithium battery 100, which includes a negative electrode 112, a positive electrode 114, a separator 113 interposed between the negative electrode 112 and the positive electrode 114, an electrolyte (not shown) impregnating the separator 113, a battery case 120, and a sealing member 140 sealing the battery case 120.

The rechargeable lithium battery of this disclosure is not limited to a prismatic type of a rechargeable lithium battery, and it may be formed in diverse forms such as a cylindrical form, a coin-type form, a pouch form as long as it includes the electrolyte for a rechargeable lithium battery and operates as a battery.

EXAMPLE

Hereinafter, examples of one or more embodiments will be described in detail including comparative examples. However, these examples are not intended to limit the scope of the one or more embodiments

Example 1

Preparation of Electrolyte for a Rechargeable Lithium Battery

An electrolyte for a rechargeable lithium battery was prepared by mixing ethylene carbonate and ethyl methyl carbonate at a volume ratio of about 3:7 (ethylene carbonate:ethyl methyl carbonate), mixing the mixture with $LiPF_6$ in such a manner that the concentration of the $LiPF_6$ become 1.0 M, and adding a compound represented by the following Chemical Formula 2 to the mixture as an additive in an amount of about 0.5 wt % based on the total weight of the electrolyte.

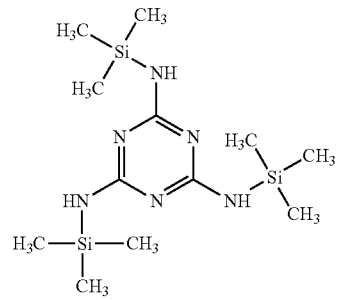

[Chemical Formula 2]

Example 2

Preparation of Electrolyte for a Rechargeable Lithium Battery

An electrolyte for a rechargeable lithium battery was prepared according to the same method as Example 1, except that the compound represented by the above Chemical Formula 2 was added as an additive in an amount of about 1 wt % based on the total weight of the electrolyte.

Example 3

Preparation of Electrolyte for a Rechargeable Lithium Battery

An electrolyte for a rechargeable lithium battery was prepared according to the same method as Example 1, except that the compound represented by the above Chemical Formula 2 was added as an additive in an amount of about 5 wt % based on the total weight of the electrolyte.

Example 4

Preparation of Electrolyte for a Rechargeable Lithium Battery

An electrolyte for a rechargeable lithium battery was prepared according to the same method as Example 1, except that the compound represented by the above Chemical Formula 2 was added as an additive in an amount of about 10 wt % based on the total weight of the electrolyte.

Comparative Example 1

Preparation of Electrolyte for a Rechargeable Lithium Battery

An electrolyte for a rechargeable lithium battery was prepared according to the same method as Example 1, except that no additive was used.

Examples 5 to 8

Fabrication of Rechargeable Lithium Battery Cells

A positive active material slurry was prepared by mixing a lithium-manganese-based oxide, $LiMn_2O_4$, polyvinylidenefluoride (PVDF) and carbon black at a weight ratio of about 92:4:4 ($LiMn_2O_4$:polyvinylidenefluoride:carbon black) in an N-methylpyrrolidone solvent. The positive active material slurry was evenly coated on a 20 μm-thick aluminum current collector, dried, and compressed, thereby fabricating a positive electrode.

A negative active material slurry was prepared by mixing crystalline artificial graphite and polyvinylidene fluoride (PVDF) at a weight ratio of about 92:8 (crystalline artificial graphite:polyvinylidene fluoride) in an N-methylpyrrolidone solvent. The negative active material slurry was evenly coated on a 15 μm-thick copper current collector, dried, and compressed, thereby fabricating a negative electrode.

Prismatic battery cells of a size of about 30 mm×48 mm×6 mm were fabricated through a conventional method by using the fabricated positive electrode and the negative electrode fabricated according to Examples 5 to 8, and using the electrolytes prepared according to Examples 1 to 4, respectively. The fabricated prismatic battery cells were sequentially referred to as battery cells of Examples 5 to 8, respectively.

Comparative Example 2

Fabrication of Rechargeable Lithium Battery Cell

Prismatic battery cells of a size of about 30 mm×48 mm×6 mm were fabricated through a conventional process by using the positive electrodes and the negative electrodes fabricated according to Examples 5 to 8 and using the electrolyte prepared according to Comparative Example 1. The fabricated prismatic battery cells were referred to as a battery cell of Comparative Example 2.

Experimental Example 1

Evaluation of High Temperature Stability

As for the electrolytes according to Examples 1 to 4 and Comparative Example 1, exotherm starting temperature and exothermic heat were measured by using a differential scanning calorimeter (DSC) and Q20 (produced by TA Instrument company). The measurement results were shown in the following Table 1.

TABLE 1

| | Exotherm starting temperature (° C.) | Exothermic heat (J/g) |
|---|---|---|
| Example 1 | 90 | 250 |
| Example 2 | 100 | 180 |
| Example 3 | 150 | 130 |
| Example 4 | 160 | 110 |
| Comparative Example 1 | 50 | 460 |

As shown in Table 1, the electrolytes according to Examples 1 to 4 had excellent stability at a high temperature, because the electrolytes prepared according to Examples 1 to 4 showed a higher exotherm starting temperature and a smaller amount of exothermic heat than the electrolyte according to Comparative Example 1.

Experimental Example 2 dQ/dV Analysis

Formation charge/discharge was performed onto the rechargeable lithium battery cells fabricated according to Examples 5 to 8 and Comparative Example 2 at about 25° C. at about 2.75 V to about 4.2 V at 0.1 C-rate, and their dQ/dV graph during the initial charge was acquired. Herein, Q denoted capacity, and V denoted voltage.

Figure 2:
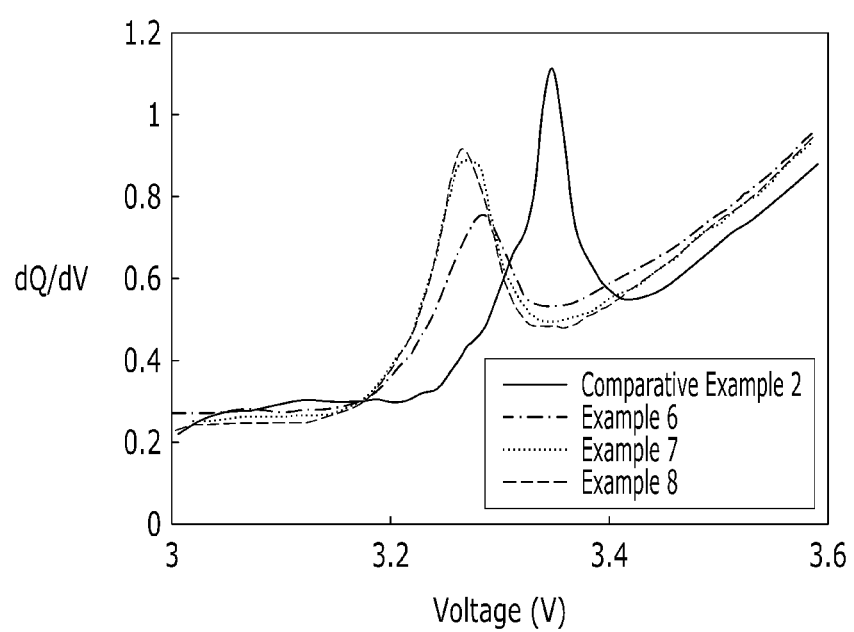
FIG. 2 is a graph showing dQ/dV of rechargeable lithium battery cells according to Examples 6 to 8 and Comparative Example 2.

Among them, dQ/dV graphs of the rechargeable lithium battery cells fabricated according to Examples 6 to 8 and Comparative Example 2 were presented in FIG. 2.

It may be seen from FIG. 2 that during the initial charge, the additives for the electrolyte included in the rechargeable lithium battery cells fabricated according to Examples 6 to 8 were reduced or decomposed prior to the non-aqueous organic solvents, which were ethylene carbonate and ethyl methyl carbonate, and formed stable SEI films on the surface of the negative electrode.

Experimental Example 3

Measurement of Initial Charge Capacity, Initial Discharge Capacity and Coulomb Efficiency Charge/discharge was performed once onto the rechargeable lithium battery cells fabricated according to Examples 5 to 8 and Comparative Example 2 at about 25° C., at about 2.75 V to 4.2 V at about 0.5 C-rate, and the initial charge capacity, the initial discharge capacity and the coulomb efficiency were measured. The results were presented in the following Table 2.

Experimental Example 4

Evaluation of Cycle-Life Characteristic

Charge/discharge was performed for 100 cycles onto the rechargeable lithium battery cells prepared according to Examples 5 to 8 and Comparative Example 2 at about 25° C. at about 2.75 V to 4.2 V at about 0.5 C-rate and 1 C-rate, and the discharge capacity retention based on the initial discharge capacity was measured. The results are presented in the following Table 2.

TABLE 2

| | Initial charge capacity (mAh/g) | Initial discharge capacity (mAh/g) | Coulomb efficiency (%) | 0.5 C-rate discharge capacity retention at $100^{th}$ cycle (%) | 1 C-rate discharge capacity retention at $100^{th}$ cycle (%) |
|---|---|---|---|---|---|
| Example 5 | 910 | 909 | 99.9 | 75 | 66 |
| Example 6 | 912 | 911 | 99.9 | 77 | 69 |
| Example 7 | 911 | 910 | 99.9 | 78 | 70 |
| Example 8 | 908 | 907 | 99.9 | 75 | 62 |
| Comparative Example 2 | 907 | 895 | 98.6 | 60 | 50 |

It can be seen from Table 2 that the rechargeable lithium battery cells fabricated according to Examples 5 to 8 had great initial charge capacity and initial discharge capacity and excellent coulomb efficiency than the rechargeable lithium battery cell fabricated according to Comparative Example 2. Also, the rechargeable lithium battery cells fabricated according to Examples 5 to 8 had excellent cycle-life characteristics in comparison to the rechargeable lithium battery cell fabricated according to Comparative Example 2.

While the present embodiments have been described in connection with what is presently considered to be practical exemplary embodiments, it is to be understood that the invention is not limited to the disclosed embodiments and is intended to cover various modifications and equivalent arrangements included within the spirit and scope of the appended claims.

What is claimed is:

1. An electrolyte for a rechargeable lithium battery, comprising:
a non-aqueous organic solvent;
a lithium salt; and
a compound represented by the following Chemical Formula 1:

[Chemical Formula 1]

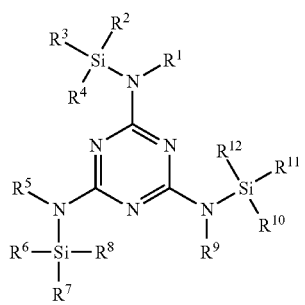

wherein
$R^1$ to $R^{12}$ are the same or different, and are each independently hydrogen, a substituted or unsubstituted C1 to C30 aliphatic organic group, a substituted or unsubstituted C3 to C30 alicyclic organic group, or a substituted or unsubstituted C6 to C30 aromatic organic group.

2. The electrolyte for a rechargeable lithium battery of claim 1, wherein the compound represented by Chemical Formula 1 has the structure of Chemical Formulae 2 to 5:

[Chemical Formula 2]

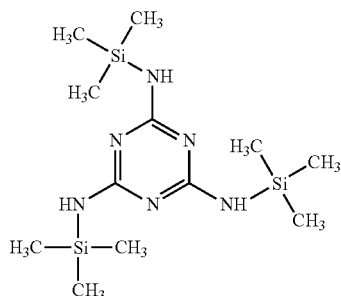

[Chemical Formula 3]

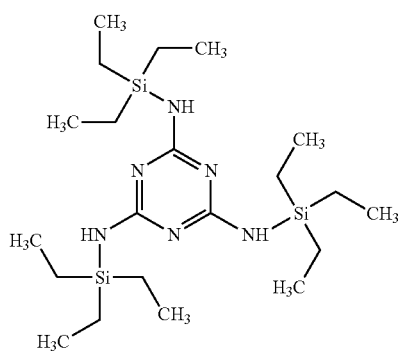

[Chemical Formula 4]

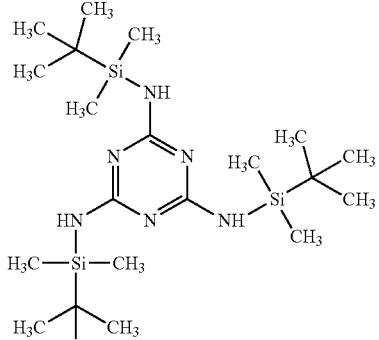

[Chemical Formula 5]

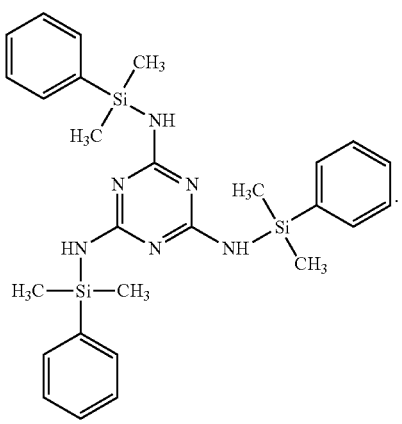

3. The electrolyte for a rechargeable lithium battery of claim 1, wherein the additive for the electrolyte for a rechargeable lithium battery is included in an amount of about 0.5 wt % to about 10 wt % based on the total weight of the electrolyte.

4. The electrolyte for a rechargeable lithium battery of claim 1, wherein the lithium salt comprises a fluorinated lithium salt.

5. The electrolyte for a rechargeable lithium battery of claim 4, wherein the fluorinated lithium salt is selected from the group consisting of $LiPF_6$, $LiBF_4$, $LiSbF_6$, $LiAsF_6$, $LiCF_3SO_3$, $LiN(SO_2C_2F_5)_2$, $Li(CF_3SO_2)_2N$, $LiN(SO_3C_2F_5)_2$, $LiC_4F_9SO_3$, $LiN(C_xF_{2x+1}SO_2)(C_yF_{2y+1}SO_2)$ and combinations thereof, where x and y are natural numbers.

6. The electrolyte for a rechargeable lithium battery of claim 5, wherein the fluorinated lithium salt is $LiPF_6$.

7. The electrolyte for a rechargeable lithium battery of claim 1, wherein the electrolyte for a rechargeable lithium battery has an exotherm starting temperature of about 90° C. or higher.

8. The electrolyte for a rechargeable lithium battery of claim 1, wherein the electrolyte for a rechargeable lithium battery has an expthermic heat of about 250 J/g or less.

9. A rechargeable lithium battery, comprising:
a positive electrode having a positive active material;
a negative electrode having a negative active material; and
an electrolyte comprising a non-aqueous organic solvent; a lithium salt; and a compound represented by the following Chemical Formula 1:

[Chemical Formula 1]

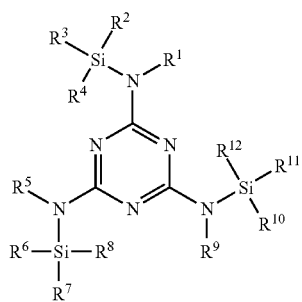

wherein $R^1$ to $R^{12}$ are the same or different, and are each independently hydrogen, a substituted or unsubstituted C1 to C30 aliphatic organic group, a substituted or unsubstituted C3 to C30 alicyclic organic group, or a substituted or unsubstituted C6 to C30 aromatic organic group.

10. The rechargeable lithium battery of claim 9, wherein the compound represented by Chemical Formula 1 has the structure of Chemical Formulae 2 to 5:

[Chemical Formula 2]

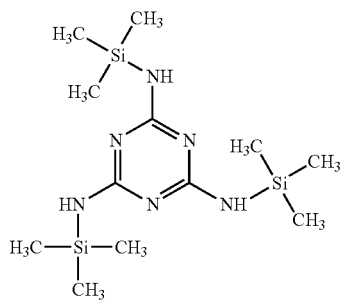

[Chemical Formula 3]

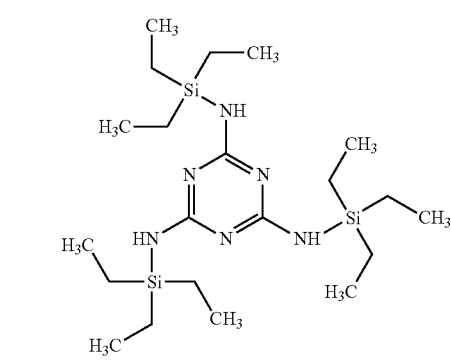

[Chemical Formula 4]

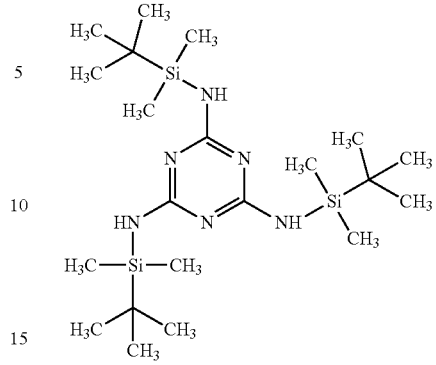

[Chemical Formula 5]

11. The rechargeable lithium battery of claim 9, wherein the additive for the electrolyte for a rechargeable lithium battery is included in an amount of about 0.5 wt % to about 10 wt % based on the total weight of the electrolyte.

12. The rechargeable lithium battery of claim 9, wherein the lithium salt comprises a fluorinated lithium salt.

13. The rechargeable lithium battery of claim 12, wherein the fluorinated lithium salt is selected from the group consisting of $LiPF_6$, $LiBF_4$, $LiSbF_6$, $LiAsF_6$, $LiCF_3SO_3$, $LiN(SO_2C_2F_5)_2$, $Li(CF_3SO_2)_2N$, $LiN(SO_3C_2F_5)_2$, $LiC_4F_9SO_3$, $LiN(C_xF_{2x+1}SO_2)(C_yF_{2y+1}SO_2)$ and combinations thereof, where x and y are natural numbers.

14. The rechargeable lithium battery of claim 9, wherein the fluorinated lithium salt is $LiPF_6$.

15. The rechargeable lithium battery of claim 9, wherein the electrolyte for a rechargeable lithium battery has an exotherm starting temperature of about 90° C. or higher.

16. The rechargeable lithium battery of claim 9, wherein the electrolyte for a rechargeable lithium battery has an expthermic heat of about 250 J/g or less.

* * * * *